(12) United States Patent
Rauwald et al.

(10) Patent No.: US 10,519,276 B2
(45) Date of Patent: *Dec. 31, 2019

(54) USE OF ALCOHOLS WHICH CONTAIN AT LEAST TWO URETHANE GROUPS FOR PRODUCING POLYETHER CARBONATE POLYOLS

(71) Applicant: Covestro Deutschland AG, Leverkusen (DE)

(72) Inventors: Urs Rauwald, Düsseldorf (DE); Jörg Hofmann, Krefeld (DE); Bert Klesczewski, Köln (DE); Hartmut Nefzger, Pulheim (DE); Aurel Wolf, Wülfrath (DE); Jens Langanke, Mechernich (DE)

(73) Assignee: Covestro Deutschland AG, Leverkusen (DE)

( * ) Notice: Subject to any disclaimer, the term of this patent is extended or adjusted under 35 U.S.C. 154(b) by 71 days.

This patent is subject to a terminal disclaimer.

(21) Appl. No.: 15/573,996

(22) PCT Filed: May 24, 2016

(86) PCT No.: PCT/EP2016/061675
§ 371 (c)(1),
(2) Date: Nov. 14, 2017

(87) PCT Pub. No.: WO2016/188992
PCT Pub. Date: Dec. 1, 2016

(65) Prior Publication Data
US 2018/0291149 A1 Oct. 11, 2018

(30) Foreign Application Priority Data
May 26, 2015 (EP) .................... 15169223

(51) Int. Cl.
C08G 64/34 (2006.01)
C08G 65/26 (2006.01)
(52) U.S. Cl.
CPC .................... C08G 64/34 (2013.01)
(58) Field of Classification Search
CPC .................................................. C08G 64/34
(Continued)

(56) References Cited

U.S. PATENT DOCUMENTS 3,404,109 A 10/1968 Milgrom
3,538,043 A 11/1970 Herold
(Continued)

FOREIGN PATENT DOCUMENTS

EP 0406440 A1 1/1991
GB 1146660 3/1969
(Continued)

OTHER PUBLICATIONS

U.S. Appl. No. 15/573,875 claims (Year: 2017).*
Inoue, S. et al.; "Copolymerization of Carbon Dioxide and Epoxide with Organometallic Compounds"; Die Makromolekulare Chemie 130, pp. 210-220, (1969); Tokyo, Japan.
Chilsolm, M. H. et al.; Macromolecules; 35 (17), pp. 6494-6504; (2002); Department of Chemistry, The Ohio State University, Columbus, Ohio; Abstract Attached.
Allen, S. D. et al.; "High-Activity, Single-Site Catalysts for the alternating Copolymerization of CO2 and Propylene Oxide", J. Am. Chem. Soc.; (2002); 124 (48); pp. 14284-14285; Department of Chemistry and Chemical Biology, Baker Laboratory, Cornell University, Ithaca, New York.
Kember, M. R. et al., "Highly Active Dizine Catalyst for the Copolymerization of Carbon Dioxide and Cyclohexene Oxide at One Atmosphere Pressure"; Agnew. Chem. Int. Ed.; 48; pp. 931-933; (2009); Wiley-VCH Verlag GmbH & Co. KGaA, Weinheim, Germany.
(Continued)

*Primary Examiner* — Duc Truong
(74) *Attorney, Agent, or Firm* — N. Denise Brown

(57) ABSTRACT

The present invention relates to a method for producing polyether carbonate polyols by attaching alkyloxides and carbon dioxide to H-functional starter compounds, characterized in that at least one alcohol containing at least two urethane groups is used as the H-functional starter compound. The invention further relates to polyether carbonate polyols containing a structural unit of the formula (IV), wherein: $R^1$ denotes a linear or branched $C_2$ to $C_{24}$-alkylene, which optionally can be interrupted by heteroatoms of O, S or N and can be substituted, preferably by $CH_2$—$CH_2$ or $CH_2$—$CH(CH_3)$; $R^2$ denotes a linear or branched $C_2$ to $C_{24}$-alkylene, $C_3$ to $C_{24}$-cycloalkylene, $C_4$ to $C_{24}$-alkylene, $C_5$ to $C_{24}$-aralkylene, $C_2$ to $C_{24}$-alkenylene, $C_2$ to $C_{24}$-alkynylene, each of which can optionally be interrupted by heteroatoms such as O, S or N and/or can be substituted with alkyl, aryl and/or hydroxyl groups, preferably $C_2$ to $C_{24}$-alkyls; $R^3$ denotes H, linear or branched $C_1$ to $C_{24}$-alkyl, $C_3$ to $C_{24}$-cycloalkyl, $C_4$ to $C_{24}$-aryl, $C_5$ to $C_{24}$-aralkyl, $C_2$ to $C_{24}$-alkenyl, $C_2$ to $C_{24}$-alkynyl, each of which can optionally be interrupted by heteroatoms such as O, S or N and/or can each be substituted with alkyl, aryl and/or hydroxyl groups, preferably H; $R^4$ denotes H, a linear of branched $C_1$ to $C_{24}$-alkyl, $C_3$ to $C_{24}$-cycloalkyl, $C_4$ to $C_{24}$-aryl, $C_5$ to $C_{24}$-aralkyl, $C_2$ to C24-alkenyl, C2 to $C_{24}$-alkynyl, each of which can optionally be interrupted by heteroatoms such as O, S or N and/or can each be substituted with alkyl, aryl and/or hydroxyl groups, preferably H; $R^5$ denotes a linear or branched $C_2$ to $C_{24}$-alkylene, which can optionally be interrupted by heteroatoms such as O, S or N and can be substituted, preferably by $CH_2$—$CH_2$ or $CH_2$—$CH(CH_3)$; and wherein R1 to R5 can be identical or different to each other.

12 Claims, No Drawings

(58) Field of Classification Search
USPC .............................................. 528/44, 49, 65
See application file for complete search history.

(56) References Cited

U.S. PATENT DOCUMENTS

| | | | |
|---|---|---|---|
| 3,654,224 | A | 4/1972 | Milgrom |
| 3,829,505 | A | 8/1974 | Herold |
| 3,941,849 | A | 3/1976 | Herold |
| 4,355,188 | A | 10/1982 | Herold et al. |
| 4,500,704 | A | 2/1985 | Kruper, Jr. et al. |
| 4,686,276 | A | 8/1987 | Myers |
| 4,721,818 | A | 1/1988 | Harper et al. |
| 4,826,953 | A | 5/1989 | Kuyper et al. |
| 4,877,906 | A | 10/1989 | Harper |
| 4,987,271 | A | 1/1991 | Watabe et al. |
| 5,010,047 | A | 4/1991 | Schuchardt |
| 5,032,671 | A | 7/1991 | Harper |
| 5,099,075 | A | 3/1992 | Katz et al. |
| 5,158,922 | A | 10/1992 | Hinney et al. |
| 5,391,722 | A | 2/1995 | Chandalia et al. |
| 5,470,813 | A | 11/1995 | Le-Khac |
| 5,482,908 | A | 1/1996 | Le-Khac |
| 5,545,601 | A | 8/1996 | Le-Khac |
| 5,627,120 | A | 5/1997 | Le-Khac |
| 5,712,216 | A | 1/1998 | Le-Khac et al. |
| 5,714,428 | A | 2/1998 | Le-Khac |
| 6,646,100 | B2 | 11/2003 | Hofmann et al. |
| 6,767,986 | B2 | 7/2004 | Moethrath et al. |
| 6,780,813 | B1 | 8/2004 | Hofmann et al. |
| 6,835,687 | B2 | 12/2004 | Hofmann et al. |
| 7,008,900 | B1 | 3/2006 | Hofmann et al. |
| 8,134,022 | B2 | 3/2012 | Haider et al. |
| 8,324,419 | B2 | 12/2012 | Mijolovic et al. |
| 8,946,466 | B2 | 2/2015 | Gürtler et al. |
| 2005/0143551 | A1 | 6/2005 | Tanaka et al. |
| 2006/0205912 | A1 | 9/2006 | Nefzger et al. |
| 2010/0048935 | A1 | 2/2010 | Mijolovic et al. |
| 2012/0165549 | A1 | 6/2012 | Ok et al. |
| 2013/0150526 | A1 | 6/2013 | Wamprecht et al. |
| 2016/0319070 | A1 | 11/2016 | Hofmann et al. |

FOREIGN PATENT DOCUMENTS

| | | | |
|---|---|---|---|
| JP | 04145123 | A | 5/1992 |
| JP | 2006063103 | A | 3/2006 |
| WO | 03029325 | A1 | 4/2003 |

OTHER PUBLICATIONS

Siefken, Von Werner; Justus Liebigs Annalen Der Chemie; "Mono- und Polyisocyanate IV. Mitteilung uber Polyisocyanate)"; 562. Band; pp. 76-136; Dec. 11, 1948; Leverkusen, Germany.

Cllements, J. H.; Ind. Eng. Chem. Res.; "Reactive Applications of Cyclic Alkylene Carbonates"; (2003); 42; pp. 663-674; (2003); Huntsman Petrochemical Corporation, Austin, Texas.

* cited by examiner

USE OF ALCOHOLS WHICH CONTAIN AT LEAST TWO URETHANE GROUPS FOR PRODUCING POLYETHER CARBONATE POLYOLS

CROSS-REFERENCE TO RELATED APPLICATIONS

This Application is a National Phase application of PCT/EP2016/061675, filed May 24, 2016, which claims priority to European Application No. 15169223.3, filed May 26, 2015, each of which being incorporated herein by reference.

FIELD

The present invention relates to a process for preparing polyether carbonate polyols by addition of alkylene oxides and carbon dioxide ($CO_2$) onto H-functional starter compounds, characterized in that at least one alcohol containing at least two urethane groups is used as the H-functional starter compound. The invention further relates to polyether carbonate polyols containing a urethane group, to the polyether carbonate polyols obtainable by the process according to the invention, to the use of the polyether carbonate polyols according to the invention for preparing a polyurethane polymer, and to the resulting polyurethane polymers.

BACKGROUND

Preparation of polyether carbonate polyols by catalytic reaction of alkylene oxides (epoxides) and carbon dioxide in the presence of H-functional starter substances (starters) has been the subject of intensive study for more than 40 years (e.g. Inoue et al., Copolymerization of Carbon Dioxide and Epoxide with Organometallic Compounds: Die Makromolekulare Chemie [Macromolecular Chemistry] 130, 210-220, 1969). This reaction is shown in schematic form in scheme (I), wherein R is an organic radical such as alkyl, alkylaryl or aryl which may in each case also contain heteroatoms, for example O, S, Si, etc., and wherein e, f, g and h represent integers, and wherein the product shown here in scheme (I) for the polyether carbonate polyol should be understood as meaning merely that blocks having the structure shown may in principle be retained in the polyether carbonate polyol obtained but the sequence, number and length of the blocks and also the OH functionality of the starter may vary and is not restricted to the polyether carbonate polyol shown in scheme (I). This reaction (see scheme (I)) is highly advantageous from an environmental standpoint since this reaction comprises converting a greenhouse gas such as $CO_2$ into a polymer. A further product formed, actually a by-product, is the cyclic carbonate shown in scheme (I) (for example propylene carbonate when R=$CH_3$, also referred to hereinafter as cPC, or ethylene carbonate when R=H, also referred to hereinafter as cEC).

(I)

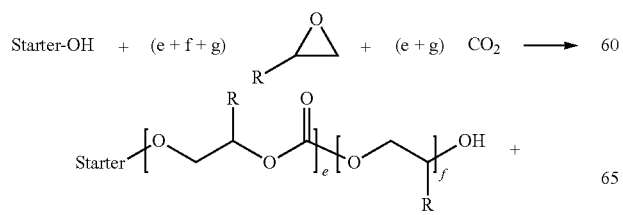

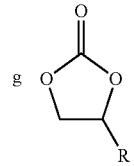

EP-A 0 222 453 discloses a process for preparing polycarbonates from alkylene oxides and carbon dioxide using a catalyst system composed of DMC catalyst and a cocatalyst such as zinc sulfate. WO-A 2003/029325 discloses a process for preparing high molecular weight aliphatic polyether carbonate polyols (weight-average molecular weight greater than 30000 g/mol) in which a catalyst from the group consisting of zinc carboxylate and multimetal cyanide compound is employed. WO-A 2008/092767 discloses a process for preparing polyether carbonate polyols, characterized in that one or more H-functional starter substances are initially charged in the reactor and that one or more H-functional starter substances are metered into the reactor continuously during the reaction.

U.S. Pat. No. 3,829,505 and DE 1 595 759 describe the possibility of reacting OH-functional starter compounds in excess with aromatic polyisocyanates to thus arrive at polyurethane polyols containing OH groups and having at least 2 urethane groups which can be used as starter oligomers for the DMC catalysis.

U.S. Pat. No. 3,654,224 describes the possibility of using amides, especially aromatic amides, for example benzamide, as a starter compound for DMC catalysis.

SUMMARY

The present invention accordingly has for its object to utilize the cyclic carbonate obtained as a by-product for the preparation of polyether carbonate polyols. The thus obtainable polyether carbonate polyols shall preferably be suitable for the preparation of polyurethanes, in particular of flexible polyurethane foams.

This object is achieved in accordance with the invention by a process for preparing polyether carbonate polyols by addition of alkylene oxides and carbon dioxide ($CO_2$) onto H-functional starter compounds, characterized in that at least one alcohol containing at least two urethane groups is used as the H-functional starter compound.

It is preferable when the process according to the invention for preparing polyether carbonate polyols by addition of alkylene oxides and carbon dioxide ($CO_2$) onto H-functional starter compounds is characterized in that at least one alcohol containing two urethane groups is used as the H-functional starter compound.

DETAILED DESCRIPTION

It is particularly preferable when the process according to the invention for preparing polyether carbonate polyols by addition of alkylene oxides and carbon dioxide ($CO_2$) onto H-functional starter compounds is characterized in that at least one alcohol of formula (II) is used as the H-functional starter compound,

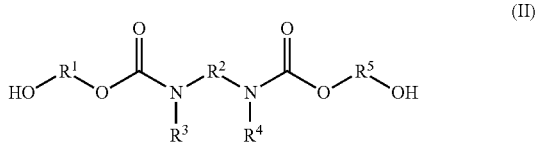

wherein

R¹ represents linear or branched $C_2$- to $C_{24}$-alkylene which may optionally be interrupted by heteroatoms such as O, S or N and may be substituted, preferably $CH_2$—$CH_2$ or $CH_2$—$CH(CH_3)$, R² represents linear or branched $C_2$- to $C_{24}$-alkylene, $C_3$- to $C_{24}$-cycloalkylene, $C_4$- to $C_{24}$-arylene, $C_5$- to $C_{24}$-aralkylene, $C_2$- to $C_{24}$-alkenylene, $C_2$- to $C_{24}$-alkynylene, each of which may optionally be interrupted by heteroatoms such as O, S or N and/or each of which may be substituted by alkyl, aryl and/or hydroxyl, preferably $C_2$- to $C_{24}$-alkylene, R³ represents H, linear or branched $C_1$- to $C_{24}$-alkyl, $C_3$- to $C_{24}$-cycloalkyl, $C_4$- to $C_{24}$-aryl, $C_5$- to $C_{24}$-aralkyl, $C_2$- to $C_{24}$-alkenyl, $C_2$- to $C_{24}$-alkynyl, each of which may optionally be interrupted by heteroatoms such as O, S or N and/or each of which may be substituted by alkyl, aryl and/or hydroxyl, preferably H, R⁴ represents H, linear or branched $C_1$- to $C_{24}$-alkyl, $C_3$- to $C_{24}$-cycloalkyl, $C_4$- to $C_{24}$-aryl, $C_5$- to $C_{24}$-aralkyl, $C_2$- to $C_{24}$-alkenyl, $C_2$- to $C_{24}$-alkynyl, each of which may optionally be interrupted by heteroatoms such as O, S or N and/or each of which may be substituted by alkyl, aryl and/or hydroxyl, preferably H, R⁵ represents linear or branched $C_2$- to $C_{24}$-alkylene which may optionally be interrupted by heteroatoms such as O, S or N and may be substituted, preferably $CH_2$—$CH_2$ or $CH_2$—$CH(CH_3)$, and wherein R¹ to R⁵ may be identical or different from one another.

The use of the word a or an in connection with countable parameters should be understood here and hereinafter to mean the number one only when this is evident from the context (for example through the wording "exactly one"). Otherwise, such expressions as "an alkylene oxide", "an alcohol containing at least two urethane groups", etc. also always comprehend embodiments in which two or more alkylene oxides, two or more alcohols containing at least two urethane groups, etc. are employed.

The invention is illustrated in detail hereinafter. Various embodiments may be combined with one another as desired, unless the opposite is clearly apparent to the person skilled in the art from the context.

The alcohols containing at least two urethane groups are obtainable by reaction of cyclic carbonates with compounds containing at least two amino groups. The alcohols containing two urethane groups are preferably obtainable by reaction of propylene carbonate and/or ethylene carbonate with compounds containing two amino groups.

The particularly preferred alcohols of formula (II) are obtainable by reaction of cyclic carbonates with diamines of formula (III),

wherein R², R³ and R⁴ are as defined above, wherein R³ and R⁴ may be identical or different from one another.

Preferably employed cyclic carbonates are propylene carbonate and/or ethylene carbonate.

Greatest preference is given to alcohols of the formula (II) obtainable by reaction of propylene carbonate and/or ethylene carbonate with diamines of formula (III).

Particular preference is given to alcohols of formula (II) obtainable by reaction of propylene carbonate and/or ethylene carbonate with at least one compound selected from the group consisting of 1,2-ethanediamine, diaminopropane, diaminopentane, diaminohexane, diaminooctane, diaminodecane, diaminododecane, diaminooctadecane, diaminoeicosane, isophoronediamine, tolylenediamine and methylenedianiline.

The reaction of the cyclic carbonates with the diamines is preferably effected at 40° C. to 80° C., particularly preferably at 55° C. to 65° C. The reaction time is preferably 5 to 40 h, particularly preferably 10 to 30 h.

In a particularly advantageous embodiment, the cyclic carbonate is used in excess. The molar ratio of cyclic carbonate to diamine is preferably 1.05 to 3, particularly preferably from 1.1 to 2, very particularly preferably from 1.2 to 1.6. The excess cyclic carbonate can be removed either directly after the synthesis of the alcohol containing at least two urethane groups, for example by thin-film evaporation, or can be left in the alcohol containing at least two urethane groups and used in the polyether carbonate polyol preparation. In the latter case the excess cyclic carbonate is removed from the product after the polyether polyol preparation.

In addition to the alcohols containing at least two urethane groups the process according to the invention may additionally also employ H-functional starter compounds without urethane groups which are described hereinafter. Suitable H-functional starter substances (starters) that may be used are compounds having alkoxylation-active H atoms which have a molar mass of 18 to 4500 g/mol, preferably of 62 to 500 g/mol and more preferably of 62 to 182 g/mol. The ability to use a starter having a low molar mass is a distinct advantage over the use of oligomeric starters prepared by means of a preceding oxyalkylation. In particular an economic viability is achieved which is made possible by the omission of a separate oxyalkylation process.

Alkoxylation-active groups having active H atoms are for example —OH, —$NH_2$ (primary amines), —NH— (secondary amines) —SH, and —$CO_2H$; preference is given to —OH and —$NH_2$; particular preference is given to —OH. H-functional starter substances employed are, for example, one or more compounds selected from the group consisting of mono- or polyhydric alcohols, polyfunctional amines, polyfunctional thiols, amino alcohols, thio alcohols, hydroxy esters, polyether polyols, polyester polyols, polyester ether polyols, polyether carbonate polyols, polycarbonate polyols, polycarbonates, polyethyleneimines, polyetheramines, polytetrahydrofurans (e.g. PolyTHF® from BASF), polytetrahydrofuranamines, polyether thiols, polyacrylate polyols, castor oil, the mono- or diglyceride of ricinoleic acid, monoglycerides of fatty acids, chemically modified mono-, di- and/or triglycerides of fatty acids, and $C_1$-$C_{24}$ alkyl fatty acid esters containing an average of at least 2 OH groups per molecule. The $C_1$-$C_{24}$ alkyl fatty acid esters containing an average of at least 2 OH groups per molecule are, for example, commercially available products such as Lupranol Balance® (BASF AG), the Merginol® range (Hobum Oleochemicals GmbH), the Sovermol® range (Cognis Deutschland GmbH & Co. KG) and the Soyol®™ range (USSC Co.).

Monofunctional starter substances that may be employed include alcohols, amines, thiols and carboxylic acids. Monofunctional alcohols that may be used include: methanol, ethanol, 1-propanol, 2-propanol, 1-butanol, 2-butanol, tert-butanol, 3-buten-1-ol, 3-butyn-1-ol, 2-methyl-3-buten-2-ol, 2-methyl-3-butyn-2-ol, propargyl alcohol, 2-methyl-2-propanol, 1-tert-butoxy-2-propanol, 1-pentanol, 2-pentanol, 3-pentanol, 1-hexanol, 2-hexanol, 3-hexanol, 1-heptanol, 2-heptanol, 3-heptanol, 1-octanol, 2-octanol, 3-octanol, 4-octanol, phenol, 2-hydroxybiphenyl, 3-hydroxybiphenyl, 4-hydroxybiphenyl, 2-hydroxypyridine, 3-hydroxypyridine, 4-hydroxypyridine. Suitable monofunctional amines include: butylamine, tert-butylamine, pentylamine, hexylamine, aniline, aziridine, pyrrolidine, piperidine, morpholine. Monofunctional thiols that may be used include: ethanethiol, 1-propanethiol, 2-propanethiol, 1-butanethiol, 3-methyl-1-butanethiol, 2-butene-1-thiol, thiophenol. Monofunctional carboxylic acids include: formic acid, acetic acid, propionic acid, butyric acid, fatty acids such as stearic acid, palmitic acid, oleic acid, linoleic acid, linolenic acid, benzoic acid, acrylic acid.

Polyhydric alcohols suitable as H-functional starter substances are, for example, dihydric alcohols (for example ethylene glycol, diethylene glycol, propylene glycol, dipropylene glycol, 1,3-propanediol, 1,4-butanediol, 1,4-butenediol, 1,4-butynediol, neopentyl glycol, 1,5-pentanediol, methylpentanediols (for example 3-methyl-1,5-pentanediol), 1,6-hexanediol, 1,8-octanediol, 1,10-decanediol, 1,12-dodecanediol, bis(hydroxymethyl)cyclohexanes (for example 1,4-bis(hydroxymethyl)cyclohexane), triethylene glycol, tetraethylene glycol, polyethylene glycols, dipropylene glycol, tripropylene glycol, polypropylene glycols, dibutylene glycol and polybutylene glycols); trihydric alcohols (for example trimethylolpropane, glycerol, trishydroxyethyl isocyanurate, castor oil); tetrahydric alcohols (for example pentaerythritol); polyalcohols (for example sorbitol, hexitol, sucrose, starch, starch hydrolyzates, cellulose, cellulose hydrolyzates, hydroxy-functionalized fats and oils, especially castor oil), and all the modification products of these aforementioned alcohols with different amounts of ε-caprolactone.

The H-functional starter substances may also be selected from the substance class of the polyether polyols having a molecular weight $M_n$ in the range from 18 to 4500 g/mol and a functionality of 2 to 3. Preference is given to polyether polyols formed from repeating ethylene oxide and propylene oxide units, preferably having a fraction of propylene oxide units of 35% to 100%, particularly preferably having a fraction of propylene oxide units of 50% to 100%. These may be random copolymers, gradient copolymers, alternating or block copolymers formed from ethylene oxide and propylene oxide. Used in particular are polyether polyols obtainable by the process according to the invention described here. To this end, these polyether carbonate polyols used as H-functional starter substances are prepared beforehand in a separate reaction step.

The H-functional starter substances may also be selected from the substance class of the polyester polyols. The polyester polyols employed are at least difunctional polyesters. Polyester polyols preferably consist of alternating acid and alcohol units. Acid components used are, for example, succinic acid, maleic acid, maleic anhydride, adipic acid, phthalic anhydride, phthalic acid, isophthalic acid, terephthalic acid, tetrahydrophthalic acid, tetrahydrophthalic anhydride, hexahydrophthalic anhydride or mixtures of the acids and/or anhydrides mentioned. Alcohol components used are, for example, ethanediol, 1,2-propanediol, 1,3-propanediol, 1,4-butanediol, 1,5-pentanediol, neopentyl glycol, 1,6-hexanediol, 1,4-bis(hydroxymethyl)cyclohexane, diethylene glycol, dipropylene glycol, trimethylolpropane, glycerol, pentaerythritol or mixtures of the alcohols mentioned. If dihydric or polyhydric polyether polyols are employed as the alcohol component, polyester ether polyols, which can likewise serve as starter substances for preparation of the polyether carbonate polyols, are obtained.

Also employable as H-functional starter substances are polycarbonate diols which are prepared, for example, by reaction of phosgene, dimethyl carbonate, diethyl carbonate or diphenyl carbonate with difunctional alcohols or polyester polyols or polyether polyols. Examples of polycarbonates may be found, for example, in EP-A 1359177.

In a further embodiment of the invention polyether carbonate polyols may be used as H-functional starter substances.

The H-functional starter substances generally have a functionality (i.e. the number of polymerization-active H atoms per molecule) of 1 to 8, preferably of 2 or 3. The H-functional starter substances are used either individually or as a mixture of at least two H-functional starter substances.

It is particularly preferable when the H-functional starter substances are one or more compounds selected from the group consisting of ethylene glycol, propylene glycol, propane-1,3-diol, butane-1,3-diol, butane-1,4-diol, pentane-1,5-diol, 2-methylpropane-1,3-diol, neopentyl glycol, hexane-1,6-diol, octane-1,8-diol, diethylene glycol, dipropylene glycol, glycerol, trimethylolpropane, pentaerythritol, sorbitol and polyether polyols having a molecular weight Mn in the range from 150 to 4500 g/mol and a functionality of 2 to 3.

The invention further provides polyether carbonate polyols containing a structural unit of formula (IV),

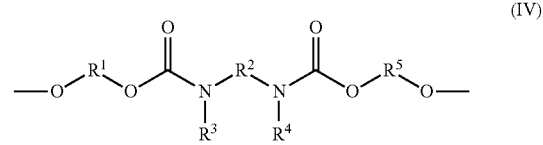

(IV)

wherein $R^1$, $R^2$, $R^3$, $R^4$ and $R^5$ are as defined above. It is preferable when the polyether carbonate polyols according to the invention contain precisely one single structural unit of formula (IV) per polyether carbonate polyol molecule.

The polyether carbonate polyols according to the invention preferably have an OH number of 3 to 400 mg KOH/g, particularly preferably 10 to 200 mg KOH/g.

Furthermore, the polyether carbonate polyols according to the invention have a functionality of 2.0 to 4.0, preferably of 2.05 to 3.00.

The present invention further provides a process for preparing polyether carbonate polyols by addition of alkylene oxides and carbon dioxide onto H-functional starter compounds, characterized in that at least one urethane alcohol of formula (II) is used as the H-functional starter compound and the addition is effected in the presence of at least one double metal cyanide catalyst (also referred to as DMC catalyst).

DMC catalysts suitable for the process of the invention are known in principle from the prior art (see for example U.S. Pat. Nos. 3,404,109, 3,829,505, 3,941,849 und U.S. Pat. No. 5,158,922). DMC catalysts, which are described for example in U.S. Pat. No. 5,470,813, EP-A-0 700 949, EP-A-0 743 093, EP-A-0 761 708, WO 97/40086, WO 98/16310 und WO 00/47649 have a very high activity in the polymerization of alkylene oxides and, in some cases, the copolymerization of alkylene oxides with suitable comonomers, for example lactones, cyclic carboxylic anhydrides, lactides, cyclic carbonates or carbon dioxide, and enable the preparation of polymeric polyols at very low catalyst concentrations (25 ppm or less), so that separation of the catalyst from the finished product is generally no longer required. A typical example is that of the highly active DMC catalysts described in EP-A-0 700 949 which contain not only a double metal cyanide compound (e.g. zinc hexacyanocobaltate(III)) and an organic complex ligand (e.g. tert-butanol) but also a polyether having a number-average molecular weight greater than 500 g/mol.

It is also possible to use the alkaline DMC catalysts disclosed in WO 2011/144523.

Cyanide-free metal salts suitable for preparing the double metal cyanide compounds preferably have the general formula (V)

$$M(X)_n \tag{V}$$

wherein
M is selected from the metal cations $Zn^{2+}$, $Fe^{2+}$, $Ni^{2+}$, $Mn^{2+}$, $Co^{2+}$, $Sr^{2+}$, $Sn^{2+}$, $Pb^{2+}$ and $Cu^{2+}$; M is preferably $Zn^{2+}$, $Fe^{2+}$, $Co^{2+}$ or $Ni^{2+}$,
X represents one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;
n is 1 when X=sulfate, carbonate or oxalate and
n is 2 when X=halide, hydroxide, cyanate, thiocyanate, isocyanate, isothiocyanate or nitrate;
or suitable cyanide-free metal salts have the general formula (VI)

$$M_r(X)_3 \tag{VI}$$

wherein
M is selected from the metal cations $Fe^{3+}$, $Al^{3+}$ and $Cr^{3+}$,
X represents one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;
r is 2 when X=sulfate, carbonate or oxalates and
r is 1 when X=halide, hydroxide, cyanate, thiocyanate, isocyanate, isothiocyanate, carboxylate or nitrate,
or suitable cyanide-free metal salts have the general formula (VII)

$$M(X)_s \tag{VII}$$

wherein
M is selected from the metal cations $Mo^{4+}$, $V^{4+}$ and $W^{4+}$,
X represents one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;
s is 2 when X=sulfate, carbonate or oxalate and
s is 4 when X=halide, hydroxide, cyanate, thiocyanate, isocyanate, isothiocyanate, carboxylate or nitrate,
or suitable cyanide-free metal salts have the general formula (VIII)

$$M(X)_t \tag{VIII}$$

wherein
M is selected from the metal cations $Mo^{6+}$ and $W^{6+}$,
X represents one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;
t is 3 when X=sulfate, carbonate or oxalate and
t is 6 when X=halide, hydroxide, cyanate, thiocyanate, isocyanate, isothiocyanate, carboxylate or nitrate.

Examples of suitable cyanide-free metal salts are zinc chloride, zinc bromide, zinc iodide, zinc acetate, zinc acetylacetonate, zinc benzoate, zinc nitrate, iron(II) sulfate, iron (II) bromide, iron(II) chloride, cobalt(II) chloride, cobalt(II) thiocyanate, nickel(II) chloride and nickel(II) nitrate. Mixtures of different metal salts may also be used.

Metal cyanide salts suitable for preparation of the double metal cyanide compounds preferably have the general formula (IX)

$$(Y)_a M'(CN)_b (A)_c \tag{IX}$$

wherein
M' is selected from one or more metal cations from the group consisting of Fe(II), Fe(III), Co(II), Co(III), Cr(II), Cr(III), Mn(II), Mn(III), Ir(III), Ni(II), Rh(III), Ru(II), V(IV) and V(V); M' is preferably one or more metal cations from the group consisting of Co(II), Co(III), Fe(II), Fe(III), Cr(III), Ir(III) and Ni(II),
Y is selected from one or more metal cations from the group consisting of alkali metal (i.e. $Li^+$, $Na^+$, $K^+$, $Rb^+$, $Cs^+$) and alkaline earth metal (i.e. $Be^{2+}$, $Ca^{2+}$, $Mg^{2+}$, $Sr^{2+}$, $Ba^{2+}$),
A is selected from one or more anions from the group consisting of halides (i.e. fluoride, chloride, bromide, iodide), hydroxide, sulfate, carbonate, cyanate, thiocyanate, isocyanate, isothiocyanate, carboxylate, oxalate or nitrate and
a, b and c are integers, wherein the values for a, b and c are selected so as to ensure electronic neutrality of the metal cyanide salt; a is preferably 1, 2, 3 or 4; b is preferably 4, 5 or 6; c preferably has the value of 0.

Examples of suitable metal cyanide salts are potassium hexacyanocobaltate(III), potassium hexacyanoferrate(II), potassium hexacyanoferrate(III), calcium hexacyanocobaltate(III) and lithium hexacyanocobaltate(III).

Preferred double metal cyanide compounds present in the DMC catalysts are compounds of general formula (X)

$$M_x[M'_{x'}(CN)_y]_z \tag{X},$$

in which M is defined as in formula (V) to (VIII) and
M' is as defined in formula (IX), and
x, x', y and z are integers and are chosen so as to ensure electronic neutrality of the double metal cyanide compound.

Preferably,
x=3, x'=1, y=6 and z=2,
M=Zn(II), Fe(II), Co(II) or Ni(II) and
M'=Co(III), Fe(III), Cr(III) or Ir(III).

Examples of suitable double metal cyanide compounds are zinc hexacyanocobaltate(III), zinc hexacyanoiridate(III), zinc hexacyanoferrate(III) and cobalt(II) hexacyanocobaltate(III). Further examples of suitable double metal cyanide compounds can be found, for example, in U.S. Pat. No. 5,158,922 (column 8, lines 29-66). Particular preference is given to using zinc hexacyanocobaltate(III).

The organic complex ligands added during preparation of the DMC catalysts are disclosed, for example, in U.S. Pat. No. 5,158,922 (see in particular column 6, lines 9 to 65), U.S. Pat. Nos. 3,404,109, 3,829,505, 3,941,849, EP-A-0 700 949, EP-A-0 761 708, JP-A-4145123, U.S. Pat. No. 5,470, 813, EP-A-0 743 093 and WO-A-97/40086). Employed organic complex ligands are, for example, water-soluble organic compounds containing heteroatomns, such as oxygen, nitrogen, phosphorus or sulfur, which can form complexes with the double metal cyanide compound. Preferred organic complex ligands are alcohols, aldehydes, ketones, ethers, esters, amides, ureas, nitriles, sulfides and mixtures thereof. Particularly preferred organic complex ligands are aliphatic ethers (such as dimethoxyethane), water-soluble aliphatic alcohols (such as ethanol, isopropanol, n-butanol, isobutanol, sec-butanol, tert-butanol, 2-methyl-3-buten-2-ol and 2-methyl-3-butyn-2-ol), compounds containing both aliphatic or cycloaliphatic ether groups and aliphatic hydroxyl groups (such as ethylene glycol mono-tert-butyl ether, diethylene glycol mono-tert-butyl ether, tripropylene glycol monomethyl ether and 3-methyl-3-oxetanemethanol for example). The organic complex ligands given greatest preference are selected from one or more compounds of the group consisting of dimethoxyethane, tert-butanol, 2-methyl-3-buten-2-ol, 2-methyl-3-butyn-2-ol, ethylene glycol mono-tert-butyl ether and 3-methyl-3-oxetanemethanol.

Optionally used in the preparation of the DMC catalysts are one or more complex-forming component(s) from the compound classes of the polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylic acid-co-maleic acid), polyacrylonitrile, polyalkyl acrylates, polyalkyl methacrylates, polyvinyl methyl ethers, polyvinyl ethyl ethers, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkyleneimines, maleic acid and maleic anhydride copolymers, hydroxyethyl cellulose and polyacetals, or of the glycidyl ethers, glycosides, carboxylic esters of polyhydric alcohols, gallic acids or salts, esters or amides thereof, cyclodextrins, phosphorus compounds, $\alpha,\beta$-unsaturated carboxylic esters or ionic surface- or interface-active compounds.

It is preferable when in the preparation of the DMC catalysts in the first step the aqueous solutions of the metal salt (e.g. zinc chloride), used in a stoichiometric excess (at least 50 mol %) based on metal cyanide salt (i.e. at least a molar ratio of cyanide-free metal salt to metal cyanide salt of 2.25:1.00), and of the metal cyanide salt (e.g. potassium hexacyanocobaltate) are reacted in the presence of the organic complex ligand (e.g. tert-butanol) to form a suspension containing the double metal cyanide compound (e.g. zinc hexacyanocobaltate), water, excess cyanide-free metal salt, and the organic complex ligands. This organic complex ligand may be present in the aqueous solution of the cyanide-free metal salt and/or of the metal cyanide salt, or it is added directly to the suspension obtained after precipitation of the double metal cyanide compound. It has proven advantageous to mix the aqueous solutions of the cyanide-free metal salt and of the metal cyanide salt and the organic complex ligands with vigorous stirring. Optionally, the suspension formed in the first step is subsequently treated with a further complex-forming component. The complex-forming component is preferably used in a mixture with water and organic complex ligand. A preferred process for performing the first step (i.e. the preparation of the suspension) is effected using a mixing nozzle, particularly preferably using a jet disperser as described in WO-A-01/39883.

In the second step, the solid (i.e. the precursor of the inventive catalyst) is isolated from the suspension by known techniques, such as centrifugation or filtration.

In a preferred variant for preparing the catalyst the isolated solid is subsequently washed in a third process step with an aqueous solution of the organic complex ligand (for example by resuspension and subsequent reisolation by filtration or centrifugation). Water-soluble by-products for example, such as potassium chloride, can be removed from the catalyst in this way. The amount of the organic complex ligand in the aqueous wash solution is preferably between 40 and 80 wt %, based on the overall solution.

Further complex-forming component is optionally added to the aqueous wash solution in the third step, preferably in the range between 0.5 wt % and 5 wt %, based on the overall solution.

It is also advantageous to wash the isolated solid more than once. To this end, the first washing procedure may be repeated for example. However, it is preferable to use non-aqueous solutions for further washing operations, e.g. a mixture of organic complex ligand and further complex-forming component.

The isolated and optionally washed solid is subsequently dried at temperatures of generally 20-100° C. and at pressures of generally 0.1 mbar to atmospheric pressure (1013 mbar), optionally after pulverizing.

A preferred process for isolating the DMC catalysts from the suspension by filtration, filtercake washing and drying is described in WO-A-01/80994.

The concentration of DMC catalyst employed is 10 ppm to 10000 ppm, preferably 20 ppm to 5000 ppm and particularly preferably 50 ppm to 500 ppm, based on the mass of the polyether carbonate polyol to be prepared. Depending on the requirement profile of the downstream application the DMC catalyst can be left in the product or (partially) separated. The (partial) separation of the DMC catalyst may be carried out by treatment with adsorbents for example. Processes for separating DMC catalysts are described in U.S. Pat. No. 4,987,271, DE-A-3132258, EP-A-0 406 440, U.S. Pat. Nos. 5,391,722, 5,099,075, 4,721,818, 4,877,906 and EP-A-0 385 619 for example.

Alkylene oxides suitable for the process according to the invention have 2 to 24 carbon atoms. The alkylene oxides having 2 to 24 carbon atoms are preferably one or more compounds selected from the group consisting of ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, mono- or polyalkylene oxidized fats as mono-, di- and triglycerides, alkylene oxidized fatty acids, $C_1$-$C_{24}$ esters of alkylene oxidized fatty acids, epichlorohydrin, glycidol, and derivatives of glycidol, for example methyl glycidyl ether, ethyl glycidyl ether, 2-ethylhexyl glycidyl ether, allyl glycidyl ether, and alkylene oxide-functional alkyloxysilanes, for example 3-glycidyloxypropyltrimethoxysilane, 3-glycidyloxypropyltriethoxysilane, 3-glycidyloxypropyltripropoxysilane, 3-glycidyloxypropylmethyldimethoxysilane, 3-glycidyloxypropylethyldiethoxysilane and 3-glycidyloxypropyltriisopropoxysilane. The alkylene oxide used is preferably at least one alkylene oxide selected from the group consisting of ethylene oxide and propylene oxide.

Further monomers copolymerizable with alkylene oxides and carbon dioxide by the process according to the invention under DMC catalysis are all oxygen-containing cyclic compounds, in particular lactones, lactides, aliphatic and aromatic cyclic carboxylic anhydrides and cyclic carbonates. Their use is described in U.S. Pat. Nos. 3,538,043, 4,500,704, 5,032,671, 6,646,100, EP-A-0 222 453 and WO-A-2008/013731.

Described in detail hereinbelow are several variants for performing the process according to the invention for preparing polyether carbonate polyols by addition of alkylene oxides and carbon dioxide onto H-functional starter compounds, characterized in that at least one urethane alcohol containing at least two urethane groups, preferably a urethane alcohol of formula (II), is used as the H-functional starter compound. The illustration is merely exemplary and should not be understood as restricting the present invention.

The process according to the invention is for example characterized in that (α) the urethane alcohol containing at least two urethane groups, preferably a urethane alcohol of formula (II) or a suspension medium, are initially charged and optionally water and/or other volatile compounds are removed by means of elevated temperature and/or reduced pressure ("drying"), wherein DMC catalyst is added to the urethane alcohol containing at least two urethane groups, preferably to the urethane alcohol of formula (II) or to the suspension medium before or after drying, (β) to achieve activation a portion (based on the total amount of alkylene oxides employed in the activation and copolymerization) of alkylene oxide is added to the mixture resulting from step (α), wherein this addition of a portion of alkylene oxide may optionally be effected in the presence of $CO_2$ and wherein the temperature spike ("hotspot") which occurs due to the exothermic chemical reaction that follows and/or a pressure drop in the reactor is then awaited in each case, and wherein step (β) for achieving activation may also be effected repeatedly, (γ) alkylene oxide, carbon dioxide and optionally urethane alcohol containing at least two urethane groups are added to the mixture resulting from step (β) ("copolymerization"), wherein at least in one of steps (α) or (γ) at least one urethane alcohol containing at least two urethane groups, preferably at least one urethane alcohol according to formula (II), is added as an H-functional starter substance.

Any optionally employed suspension media contain no H-functional groups. Suitable suspension media are all polar aprotic, weakly polar aprotic and nonpolar aprotic solvents, none of which contain any H-functional groups. A mixture of two or more of these suspension media may also be used as suspension medium. The following polar aprotic solvents are mentioned here by way of example: 4-methyl-2-oxo-1,3-dioxolane (also referred to hereinbelow as cyclic propylene carbonate or cPC), 1,3-dioxolan-2-one (also referred to hereinbelow as cyclic ethylene carbonate or cEC), acetone, methyl ethyl ketone, acetonitrile, nitromethane, dimethyl sulfoxide, sulfolane, dimethylformamide, dimethylacetamide and N-methylpyrrolidone. The group of the nonpolar and weakly polar aprotic suspension media includes, for example, ethers, for example dioxane, diethyl ether, methyl tert-butyl ether and tetrahydrofuran, esters, for example ethyl acetate and butyl acetate, hydrocarbons, for example pentane, n-hexane, benzene and alkylated benzene derivatives (e.g. toluene, xylene, ethylbenzene) and chlorinated hydrocarbons, for example chloroform, chlorobenzene, dichlorobenzene and carbon tetrachloride. Preferably employed as suspension media are 4-methyl-2-oxo-1,3-dioxolane, 1,3-dioxolan-2-one, toluene, xylene, ethylbenzene, chlorobenzene and dichlorobenzene, and mixtures of two or more of these suspension media; particular preference is given to 4-methyl-2-oxo-1,3-dioxolane and 1,3-dioxolan-2-one or a mixture of 4-methyl-2-oxo-1,3-dioxolane and 1,3-dioxolan-2-one.

Step (α): (Drying)

Preferably, in step (α) a suspension medium containing no H-functional groups is initially charged in the reactor, optionally together with DMC catalyst, and no H-functional starter substance is initially charged in the reactor. Alternatively, in step (α) a suspension medium containing no H-functional groups and, in addition, a portion of the urethane alcohol containing at least two urethane groups, preferably the urethane alcohol of formula (II), and optionally DMC catalyst may also be initially charged in the reactor or in step (α) a portion of the urethane alcohol containing at least two urethane groups, preferably the urethane alcohol of formula (II), and optionally DMC catalyst may also be initially charged in the reactor. Furthermore, in step (α) the total amount of the urethane alcohol containing at least two urethane groups, preferably the urethane alcohol of formula (II), and optionally DMC catalyst may also be initially charged in the reactor.

In a preferred embodiment inert gas (for example argon or nitrogen), an inert gas/carbon dioxide mixture or carbon dioxide is introduced into the resulting mixture of DMC catalyst with suspension medium and/or urethane alcohol containing at least two urethane groups, preferably a urethane alcohol of formula (II), at a temperature of 90° C. to 150° C., particularly preferably of 100° C. to 140° C., and at the same time a reduced pressure (absolute) of 10 mbar to 800 mbar, particularly preferably of 50 mbar to 200 mbar, is applied.

In an alternative preferred embodiment the resulting mixture of DMC catalyst with suspension medium and/or urethane alcohol containing at least two urethane groups, preferably a urethane alcohol of formula (II), at a temperature of 90° C. to 150° C., particularly preferably of 100° C. to 140° C., is contacted at least once, preferably three times, with 1.5 bar to 10 bar (absolute), particularly preferably 3 bar to 6 bar (absolute), of an inert gas (for example argon or nitrogen), an inert gas/carbon dioxide mixture or carbon dioxide and then the gauge pressure is reduced in each case to about 1 bar (absolute).

The DMC catalyst may be added for example in solid form or as a suspension in one or more suspension media or as a suspension in a urethane alcohol containing at least two urethane groups, preferably in a urethane alcohol of formula (II).

In a further preferred embodiment in step (α)

(α-I) suspension medium and/or a portion or the total amount of urethane alcohol containing at least two urethane groups, preferably urethane alcohol according to formula (II), is initially charged and (α-II) the temperature of the suspension medium and/or of the urethane alcohol containing at least two urethane groups, preferably of the urethane alcohol of formula (II), is brought to 50° C. to 200° C., preferably 80° C. to 160° C., particularly preferably 100° C. to 140° C., and/or the pressure in the reactor is lowered to less than 500 mbar, preferably 5 mbar to 100 mbar, and an inert gas stream (for example of argon or nitrogen), an inert gas/carbon dioxide stream or a carbon dioxide stream is optionally passed through the reactor, wherein the double metal cyanide catalyst is added to the suspension medium and/or to the urethane alcohol containing at least two urethane groups, preferably urethane alcohol of formula (II), in step (α-I) or immediately thereafter in step (α-II) and
wherein the suspension medium contains no H-functional groups.

Step (β): (Activation)

Step (β) serves to activate the DMC catalyst. This step may optionally be performed under an inert gas atmosphere, under an atmosphere of inert gas/carbon dioxide mixture or under a carbon dioxide atmosphere. Activation in the context of this invention refers to a step in which a portion of alkylene oxide is added to the DMC catalyst suspension at temperatures of 90° C. to 150° C. and then the addition of the alkylene oxide is stopped, with observation of evolution of heat caused by a subsequent exothermic chemical reaction, which can lead to a temperature spike ("hotspot"), and of a pressure drop in the reactor caused by the conversion of alkylene oxide and possibly $CO_2$. The process step of activation is the period from addition of the portion of alkylene oxide, optionally in the presence of $CO_2$, to the DMC catalyst until evolution of heat is observed. Optionally, the portion of alkylene oxide may be added to the DMC catalyst in a plurality of individual steps, optionally in the presence of $CO_2$, and the addition of the alkylene oxide interrupted in each case. In this case the process step of activation comprises the period from addition of the first portion of alkylene oxide, optionally in the presence of $CO_2$, to the DMC catalyst until evolution of heat occurs after addition of the last portion of alkylene oxide. The activation step may generally be preceded by a step for drying the DMC catalyst and optionally the urethane alcohol containing at least two urethane groups at elevated temperature and/or reduced pressure, optionally by passage of an inert gas through the reaction mixture.

Metered addition of one or more alkylene oxides (and optionally of the carbon dioxide) may in principle be effected in different ways. Commencement of metered addition may be effected from the vacuum or at a preselected supply pressure. The supply pressure is preferably established by introduction of an inert gas (for example nitrogen or argon) or of carbon dioxide, wherein the pressure (in absolute terms) is 5 mbar to 100 bar, preferably 10 mbar to 50 bar and by preference 20 mbar to 50 bar.

In a preferred embodiment the amount of one or more alkylene oxides used in the activation in step (β) is 0.1 to 25.0% by weight, preferably 1.0 to 20.0% by weight, particularly preferably 2.0 to 16.0% by weight (based on the amount of suspension medium and/or urethane alcohol containing at least two urethane groups, preferably urethane alcohol of formula (II), employed in step (α)). The alkylene oxide may be added in one step or in two or more portions. Preferably, after addition of a portion of alkylene oxide, the addition of the alkylene oxide is interrupted until evolution of heat occurs and only then is the next portion of alkylene oxide added. Also preferred is a two-stage activation (step β), wherein (β1) in a first activation stage addition of a first portion of alkylene oxide under an inert gas atmosphere is effected and (β2) in a second activation stage addition of a second portion of alkylene oxide under a carbon dioxide atmosphere is effected.

Step (γ): (Copolymerization)

For the process according to the invention, it has been found that step (γ) is advantageously performed at 50° C. to 150° C., preferably at 60° C. to 145° C., particularly preferably at 70° C. to 140° C. and very particularly preferably at 90° C. to 130° C. Below 50° C., the reaction to form a polyether carbonate polyol proceeds only very gradually. At temperatures above 150° C. the amount of unwanted by-products rises severely.

The metered addition of one or more alkylene oxides and the carbon dioxide can be effected simultaneously, alternately or sequentially, wherein the total amount of carbon dioxide can be added all at once or in the form of a metered addition over the reaction time. It is possible during addition of the alkylene oxide to increase or reduce the $CO_2$ pressure gradually or stepwise or to leave it unchanged. It is preferable when the total pressure is kept constant during the reaction by replenishment of carbon dioxide. The metered addition of one or more alkylene oxides is effected simultaneously, alternately or sequentially with the metered addition of carbon dioxide. It is possible to effect metered addition of the alkylene oxide at a constant metering rate or to increase or lower the metering rate gradually or stepwise or to add the alkylene oxide portionwise. The alkylene oxide is preferably added to the reaction mixture at a constant metering rate. If two or more alkylene oxides are used for synthesis of the polyether carbonate polyols the alkylene oxides may be metered in individually or as a mixture. The metered addition of the alkylene oxides may be effected simultaneously, alternately or sequentially, each via separate metering points (addition points), or via one or more metering points and the alkylene oxides may be metered in individually or as a mixture. It is possible via the manner and/or sequence of the metered addition of the alkylene oxides and/or of the carbon dioxide to synthesize random, alternating, block-type or gradient-type polyether carbonate polyols.

It is preferable to use an excess of carbon dioxide based on the calculated amount of carbon dioxide incorporated in the polyether carbonate polyol, since an excess of carbon dioxide is advantageous because of the inertness of carbon dioxide. The amount of carbon dioxide can be fixed via the total pressure under the respective reaction conditions. An advantageous total (absolute) pressure for the copolymerization for preparation of the polyether carbonate polyols has been found to be the range from 0.01 to 120 bar, preferably 0.1 to 110 bar, more preferably from 1 to 100 bar. It is possible to supply the carbon dioxide continuously or discontinuously. This depends on how quickly the alkylene oxides and the $CO_2$ are consumed and on whether the product is to include any $CO_2$-free polyether blocks or blocks having a different $CO_2$ content. The amount of the carbon dioxide (reported as pressure) may likewise vary during addition of the alkylene oxides. Depending on the reaction conditions chosen the $CO_2$ may be introduced into the reactor in the gaseous, liquid or supercritical state. $CO_2$ may also be added to the reactor as a solid and then converted to the gaseous, dissolved, liquid and/or supercritical state under the chosen reaction conditions.

In a process with metered addition of urethane alcohol containing at least two urethane groups, preferably of urethane alcohol according to formula (II), in step (γ) the metered addition of the urethane alcohol containing at least two urethane groups, preferably of the urethane alcohol according to formula (II), of one or more alkylene oxides and optionally also of the carbon dioxide may be effected simultaneously or sequentially (portionwise); for example, it is possible to add the entire amount of carbon dioxide, the amount of urethane alcohol containing at least two urethane groups, preferably of urethane alcohol of formula (II), and/or the amount of alkylene oxides metered in in step (γ) all at once or continuously. The term "continuously" used here can be defined as a mode of addition of a reactant such that a concentration of the reactant effective for the copolymerization is maintained, i.e. the metered addition can be effected at a constant metering rate, at a varying metering rate or portionwise for example.

It is possible during addition of the alkylene oxide and/or of the urethane alcohol containing at least two urethane groups, preferably of the urethane alcohol of formula (II), to increase or to lower the $CO_2$ pressure gradually or stepwise or to leave it unchanged. It is preferable when the total pressure is kept constant during the reaction by replenishment of carbon dioxide. The metered addition of one or more alkylene oxides and/or of the urethane alcohol containing at least two urethane groups, preferably of the urethane alcohol of formula (II), is effected simultaneously or sequentially with the carbon dioxide metered addition. It is possible to effect metered addition of the alkylene oxide at a constant metering rate or to increase or lower the metering rate gradually or stepwise or to add the alkylene oxide portionwise. The alkylene oxide is preferably added to the reaction mixture at a constant metering rate. If two or more alkylene oxides are used for synthesis of the polyether carbonate polyols the alkylene oxides may be metered in individually or as a mixture. The metered addition of the alkylene oxides/of the urethane alcohol containing at least two urethane groups, preferably of the urethane alcohol according to formula (II), may be effected simultaneously or sequentially, each via separate metering points (addition points), or via one or more metering points and the alkylene oxides/the urethane alcohol containing at least two urethane groups, preferably the urethane alcohol according to formula (II), may be metered in individually or as a mixture. It is possible via the manner and/or sequence of the metered addition of the urethane alcohol containing at least two urethane groups, preferably the urethane alcohol according to formula (II), of the alkylene oxides and/or of the carbon dioxide to synthesize random, alternating, block-type or gradient-type polyether carbonate polyols.

In a preferred embodiment in step (γ) the metered addition of the urethane alcohol containing at least two urethane groups, preferably of the urethane alcohol according to formula (II), is terminated at a juncture prior to the addition of the alkylene oxide.

One preferred embodiment of the process according to the invention is inter alia characterized in that in step (γ) the total amount of the urethane alcohol containing at least two urethane groups, preferably of the urethane alcohol according to formula (II), is added, i.e. a suspension medium is employed in step (α). This addition can be effected at a constant metering rate, at a varying metering rate or portionwise.

The polyether carbonate polyols are preferably prepared in a continuous process which comprises both a continuous copolymerization and a continuous addition of the urethane alcohol containing at least two urethane groups, preferably of the urethane alcohol of formula (II). The invention thus further provides a process wherein in step (γ) urethane alcohol containing at least two urethane groups, preferably urethane alcohol of formula (II), alkylene oxide and DMC catalyst are metered into the reactor continuously in the presence of carbon dioxide ("copolymerization") and wherein the resulting reaction mixture (containing the reaction product) is removed from the reactor continuously. It is preferable when in step (γ) the DMC catalyst suspended in the urethane alcohol of formula (II) is added continuously.

The metered addition of the alkylene oxide, of the urethane alcohol containing at least two urethane groups, preferably of the urethane alcohol of formula (II) and of the DMC catalyst may be effected via separate or common metering points. In a preferred embodiment the alkylene oxide and the urethane alcohol containing at least two urethane groups, preferably the urethane of formula (II), are supplied to the reaction mixture continuously via separate metering points. This addition of the urethane alcohol containing at least two urethane groups, preferably the urethane alcohol of formula (II), may be effected as a continuous metered addition into the reactor or portionwise.

For example, for the continuous process for preparing the polyether carbonate polyols in steps (α) and (β) an activated DMC catalyst/suspension medium mixture is prepared, then according to step (γ), (γ1) a portion of each of urethane alcohol containing at least two urethane groups, preferably of urethane alcohol of formula (II), one or more alkylene oxides and carbon dioxide are metered in to initiate the copolymerization, and (γ2) over the course of the copolymerization the remaining amount of each of DMC catalyst, urethane alcohol containing at least two urethane groups, preferably urethane alcohol of formula (II) and alkylene oxides are metered in continuously in the presence of carbon dioxide, wherein simultaneously resulting reaction mixture is removed from the reactor continuously.

In step (γ) the DMC catalyst is preferably added as a suspension in urethane alcohol containing at least two urethane groups, preferably in urethane alcohol according to formula (II).

Steps (α), (β) and (γ) may be performed in the same reactor or may each be performed separately in different reactors. Particularly preferred reactor types are: tubular reactors, stirred tanks, loop reactors.

Steps (α), (β) and (γ) may be performed in a stirred tank, wherein depending on the embodiment and the operating mode the stirred tank is cooled via the reactor shell, internal cooling surfaces and/or cooling surfaces within a pumped circulation system. Both in the semi-batchwise process, in which the product is withdrawn only after the reaction has ended, and in the continuous process, in which the product is withdrawn continuously, particular attention should be paid to the metering rate of the alkylene oxide. It should be adjusted such that despite the inhibiting effect of the carbon dioxide the alkylene oxides react sufficiently rapidly.

In a preferred embodiment the mixture containing activated DMC catalyst resulting from steps (α) and (β) is further reacted with one or more alkylene oxides, urethane alcohol containing at least two urethane groups, preferably urethane alcohol of formula (II), and carbon dioxide in the same reactor. In a further preferred embodiment, the mixture containing activated DMC catalyst resulting from steps (α) and (β) is further reacted with alkylene oxides, one or more starter substances and carbon dioxide in a different reaction vessel (for example a stirred tank, tubular reactor or loop reactor).

When the reaction is run in a tubular reactor the mixture containing activated DMC catalyst resulting from steps (α) and (α), a urethane alcohol containing at least two urethane groups, preferably a urethane alcohol of formula (II), one or more alkylene oxides and carbon dioxide are continuously pumped through a tube. The molar ratios of the co-reactants vary according to the desired polymer. In a preferred embodiment carbon dioxide is metered in in its liquid or supercritical form to achieve optimal miscibility of the components. It is advantageous to install mixing elements for better mixing of the co-reactants, such as are marketed for example by Ehrfeld Mikrotechnik BTS GmbH, or mixer-heat exchanger elements which simultaneously improve mixing and heat removal.

Loop reactors may likewise be used for performing steps (α), (β) and (γ). These generally include reactors with recycling of matter, for example a jet loop reactor, which can also be operated continuously, or a tubular reactor configured in the form of a loop with suitable apparatuses for circulation of the reaction mixture, or a loop of several series-connected tubular reactors. The use of a loop reactor is advantageous particularly because backmixing may be realized here, so that the concentration of free alkylene oxides in the reaction mixture may be kept within the optimal range, preferably in the range from >0 to 40 wt %, particularly preferably >0 to 25 wt %, most preferably >0 to 15 wt % (in each case based on the weight of the reaction mixture).

Preferably, steps (α) and (β) are performed in a first reactor, and the resulting reaction mixture is then transferred into a second reactor for the copolymerization of step (γ). However, it is also possible to perform steps (α), (β) and (γ) in one reactor.

The process according to the invention may also be run such that initially a DMC catalyst activated in a suspension medium according to steps (α) and (β) is used and during the copolymerization (γ) the DMC catalyst is added without prior activation. A particularly advantageous feature of the preferred embodiment of the present invention is thus the ability to use "fresh" DMC catalysts without activation for the portion of DMC catalyst which is added continuously in step (γ). An activation of DMC catalysts to be performed analogously to step (β) entails not just additional attention from the operator, thus resulting in an increase in manufacturing costs, but also requires a pressure reaction vessel, thus also resulting in an increase in the capital costs in the construction of a corresponding production plant. Here, "fresh" DMC catalyst is defined as unactivated DMC catalyst in solid form or in the form of a slurry in a starter substance or suspension medium. The ability of the present process to use fresh unactivated DMC catalyst in step (γ) enables significant savings in the commercial preparation of polyether carbonate polyols and is a preferred embodiment of the present invention.

The term "continuously" used here can be defined as the mode of addition of a relevant catalyst or reactant such that an essentially continuous effective concentration of the DMC catalyst or the reactant is maintained. Catalyst feeding may be effected in a truly continuous manner or in relatively tightly spaced increments. Equally, continuous starter addition may be effected in a truly continuous manner or in increments. There would be no departure from the present process in adding a DMC catalyst or reactant incrementally such that the concentration of the materials added drops essentially to zero for a period of time before the next incremental addition. However, it is preferable when the DMC catalyst concentration during the main part of the course of the continuous reaction is essentially kept at the same concentration and that starter substance is present during the main portion of the copolymerization process. Incremental addition of DMC catalyst and/or reactant that does not significantly affect the characteristics of the product is nevertheless "continuous" in the sense in which the term is used here. It is possible, for example, to provide a recycling loop in which a portion of the reacting mixture is recycled to a prior point in the process, thus smoothing out discontinuities caused by incremental additions.

Step (δ)

Optionally, in a step (δ) the reaction mixture resulting from the copolymerization, preferably the reaction mixture continuously removed in step (γ), which generally has an alkylene oxide content of 0.05 to 10 wt %, may be transferred into a postreactor in which, by way of a postreaction, the content of free alkylene oxide is reduced to less than 0.05 wt % in the reaction mixture. The postreactor may be a tubular reactor, a loop reactor or a stirred tank for example. The pressure in this postreactor is preferably at the same pressure as in the reaction apparatus in which reaction step (γ) is performed. However, the pressure in the downstream reactor may also be higher or lower. In a further preferred embodiment, the carbon dioxide is fully or partly discharged after reaction step (γ) and the downstream reactor is operated at standard pressure or a slight positive pressure. The temperature in the downstream reactor is preferably 50° C. to 150° C. and particularly preferably 80° C. to 140° C.

The content of volatile constituents in the resulting polyether carbonate polyol can then be reduced thermally, preferably at a temperature of 80° C. to 200° C. Reduction of the volatile constituents by thermal means may be achieved using the methods generally known to those skilled in the art from the prior art. For example the thermal reduction of the volatile constituents may be achieved by thin film evaporation, short-path evaporation or falling film evaporation, wherein this is preferably performed under reduced pressure (vacuum). It is also possible to employ classical distillation processes where the polyether carbonate polyol is heated to a temperature of from 80° C. to 200° C. in a flask or a stirred tank for example and the volatile constituents are distilled off overhead. The efficiency of the distillation may be enhanced by employing reduced pressure and/or employing an inert stripping gas (for example nitrogen) and/or employing an entraining agent (for example water or inert organic solvent). The reduction in volatile constituents may also be achieved by vacuum stripping in a packed column, wherein steam or nitrogen are typically employed as the stripping gas.

In addition to the preferably employed DMC catalysts based on zinc hexacyanocobaltate ($Zn_3[Co(CN)_6]_2$) the process according to the invention may also employ other metal complex catalysts based on the metals zinc and/or cobalt and familiar to those skilled in the art from the prior art for the copolymerization or epoxides and carbon dioxide. This includes in particular so-called zinc glutarate catalysts (described, for example, in M. H. Chisholm et al., Macromolecules 2002, 35, 6494), so-called zinc diiminate catalysts (described, for example, in S. D. Allen, J. Am. Chem. Soc. 2002, 124, 14284), so-called cobalt salen catalysts (described, for example, in U.S. Pat. No. 7,304,172 B2, US 2012/0165549 A1) and bimetallic zinc complexes having macrocyclic ligands (described, for example, in M. R. Kember et al., Angew. Chem., Int. Ed., 2009, 48, 931).

The present invention further provides a polyether carbonate polyol obtainable by the process of the invention.

The OH numbers of the obtained polyether carbonate polyols preferably have values of 3 mg KOH/g to 400 mg KOH/g, particularly preferably of 10 mg KOH/g to 200 mg KOH/g, very particularly preferably of 20 mg KOH/g to 150 mg KOH/g.

The equivalent molar mass is understood to mean the total mass of the material containing active hydrogen atoms divided by the number of active hydrogen atoms. In the case of materials containing hydroxyl groups it is related to OH number by the relation:

equivalent molar mass=56 100/OH number [mg KOH/g]

Aging stabilizers, for example antioxidants, may optionally be added to the polyether carbonate polyols obtainable by the process according to the invention.

The present invention further relates to the use of a polyether carbonate polyol according to the invention for preparing a polyurethane polymer, preferably a flexible polyurethane foam, particularly preferably a flexible slabstock polyurethane foam or a flexible molded polyurethane foam.

The present invention further provides a polyurethane polymer, preferably a flexible polyurethane foam, particularly preferably a flexible slabstock polyurethane foam or a flexible molded polyurethane foam, obtainable by reaction of a polyisocyanate with a polyether carbonate polyol according to the invention by a process familiar to the person skilled in the art, with the aid of customary additives, for example activators, stabilizers, blowing agents, crosslinkers, chain extenders and/or fillers, and optionally further polyether polyols, polyester polyols, polyether carbonate polyols, polycarbonate polyols and/or filler-containing polyols (polymer polyols, polyurea dispersions, etc.).

Suitable polyisocyanates are aliphatic, cycloaliphatic, araliphatic, aromatic and heterocyclic polyisocyanates, as described, for example, by W. Siefken in Justus Liebigs Annalen der Chemie, 562, pages 75 to 136, for example those of formula (XI)

$$Q(NCO)_n, \qquad (XI)$$

in which
n=2-4, preferably 2-3,
and
Q represents an aliphatic hydrocarbon radical having 2-18, preferably 6-10, carbon atoms, a cycloaliphatic hydrocarbon radical having 4-15, preferably 6-13, carbon atoms or an araliphatic hydrocarbon radical having 8-15, preferably 8-13, carbon atoms.

The polyisocyanates are for example those described in EP 0 007 502 A1, pages 7-8. Preference is generally given to the readily industrially available polyisocyanates, for example tolylene 2,4- and 2,6-diisocyanate and any desired mixtures of these isomers ("TDI"); polyphenyl polymethylene polyisocyanates as prepared by aniline-formaldehyde condensation and subsequent phosgenation ("crude MDI"), and polyisocyanates having carbodiimide groups, urethane groups, allophanate groups, isocyanurate groups, urea groups or biuret groups ("modified polyisocyanates"), in particular modified polyisocyanates deriving from tolylene 2,4- and/or 2,6-diisocyanate or from diphenylmethane 4,4'- and/or 2,4'-diisocyanate. The polyisocyanates containing urethane groups (prepolymers) may, for example, be reaction products of polyisocyanates with polyester polyols or else any other polyols (for example conventional polyether polyols). The polyisocyanate used is preferably at least one compound selected from the group consisting of tolylene 2,4- and 2,6-diisocyanate, diphenylmethane 4,4'- and 2,4'- and 2,2'-diisocyanate and polyphenylpolymethylene polyisocyanate ("multiring MDI"); the polyisocyanate used is particularly preferably a mixture containing diphenylmethane 4,4'-diisocyanate and diphenylmethane 2,4'-diisocyanate and polyphenylpolymethylene polyisocyanate.

In addition to the abovementioned polyisocyanates, preparation of the polyurethane polymers, preferably of the flexible polyurethane foams, particularly preferably of the flexible slabstock polyurethane foams or of the flexible molded polyurethane foams, may additionally employ conventional polyether polyols. Conventional polyether polyols in the context of the invention are understood to mean compounds which are alkylene oxide addition products of starter compounds having Zerewitinoff-active hydrogen atoms. Examples of such polyether polyols are known to those skilled in the art. They may have a hydroxyl number according to DIN 53240 of ≤3.0 mg KOH/g to ≤1000 mg KOH/g, preferably of ≥5.0 mg KOH/g to ≤600 mg KOH/g. The starter compounds having Zerewitinoff-active hydrogen atoms used for preparing the conventional polyether polyols usually have functionalities of 2 to 8. The starter compounds may be hydroxyl-functional and/or amino-functional. Examples of hydroxyl-functional starter compounds are propylene glycol, ethylene glycol, diethylene glycol, dipropylene glycol, butane-1,2-diol, butane-1,3-diol, butane-1,4-diol, hexanediol, pentanediol, 3-methylpentane-1,5-diol, dodecane-1,12-diol, glycerol, trimethylolpropane, triethanolamine, pentaerythritol, sorbitol, sucrose, hydroquinone, catechol, resorcinol, bisphenol F, bisphenol A, 1,3,5-trihydroxybenzene, methylol-containing condensates of formaldehyde and phenol or melamine or urea. Examples of amino-functional starter compounds are ammonia, ethanolamine, diethanolamine, triethanolamine, isopropanolamine, diisopropanolamine, ethylenediamine, hexamethylenediamine, aniline, the isomers of toluidine, the isomers of diaminotoluene, the isomers of diaminodiphenylmethane, and higher polycyclic products obtained in the condensation of aniline with formaldehyde to give diaminodiphenylmethane.

Suitable alkylene oxides for the conventional polyether polyols are, for example, ethylene oxide, propylene oxide, 1,2-butylene oxide or 2,3-butylene oxide and styrene oxide. It is preferable when propylene oxide and ethylene oxide are supplied to the reaction mixture individually, in admixture or successively. If the alkylene oxides are metered in successively, the products prepared contain polyether chains having block structures. Products having ethylene oxide end blocks are characterized, for example, by elevated concentrations of primary end groups which impart advantageous isocyanate reactivity to the systems.

The preparation of the conventional polyether polyols may be base-catalyzed, for example via alkali metal hydroxide or amine catalysis, double metal cyanide-catalyzed, or acid-catalyzed by Lewis or Brønsted acids.

In addition to the abovementioned conventional polyether polyols, preparation of the polyurethane polymers, preferably of the flexible polyurethane foams, particularly preferably of the flexible slabstock polyurethane foams or of the flexible molded polyurethane foams, may additionally or alternatively employ polyester polyols. Suitable polyester polyols preferably have OH numbers in the range from 6 to 800 mg KOH/g and may be prepared, for example, from polyfunctional carboxylic acids, preferably organic dicarboxylic acids having 2 to 12 carbon atoms, and polyhydric alcohols, preferably diols, having 2 to 12 carbon atoms, preferably 2 to 6 carbon atoms, by known methods. Instead of the polyfunctional carboxylic acids it is also possible to use derivatives thereof, for example acid chlorides or anhydrides.

In a first embodiment the invention accordingly relates to a process for preparing polyether carbonate polyols by addition of alkylene oxides and carbon dioxide onto H-functional starter compounds, characterized in that at least one alcohol containing at least two urethane groups is used as the H-functional starter compound.

In a second embodiment the invention relates to a process according to the first embodiment, characterized in that at least one alcohol containing two urethane groups is used as the H-functional starter compound.

In a third embodiment the invention relates to a process according to the second embodiment, characterized in that at least one alcohol containing two urethane groups of formula (II) is used as the H-functional starter compound,

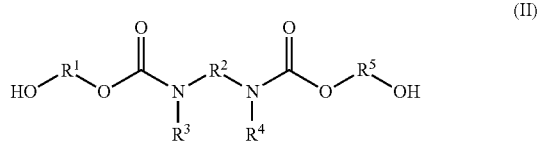

wherein
$R^1$ represents linear or branched $C_2$- to $C_{24}$-alkylene which may optionally be interrupted by heteroatoms such as O, S or N and may be substituted, preferably $CH_2$—$CH_2$ or $CH_2$—$CH(CH_3)$,
$R^2$ represents linear or branched $C_2$- to $C_{24}$-alkylene, $C_3$- to $C_{24}$-cycloalkylene, $C_4$- to $C_{24}$-arylene, $C_5$- to $C_{24}$-aralkylene, $C_2$- to $C_{24}$-alkenylene, $C_2$- to $C_{24}$-alkynylene, each of which may optionally be interrupted by heteroatoms such as O, S or N and/or each of which may be substituted by alkyl, aryl and/or hydroxyl, preferably $C_2$- to $C_{24}$-alkylene,
$R^3$ represents H, linear or branched $C_1$- to $C_{24}$-alkyl, $C_3$- to $C_{24}$-cycloalkyl, $C_4$- to $C_{24}$-aryl, $C_5$- to $C_{24}$-aralkyl, $C_2$- to $C_{24}$-alkenyl, $C_2$- to $C_{24}$-alkynyl, each of which may optionally be interrupted by heteroatoms such as O, S or N and/or each of which may be substituted by alkyl, aryl and/or hydroxyl, preferably H,
$R^4$ represents H, linear or branched $C_1$- to $C_{24}$-alkyl, $C_3$- to $C_{24}$-cycloalkyl, $C_4$- to $C_{24}$-aryl, $C_5$- to $C_{24}$-aralkyl, $C_2$- to $C_{24}$-alkenyl, $C_2$- to $C_{24}$-alkynyl, each of which may optionally be interrupted by heteroatoms such as O, S or N and/or each of which may be substituted by alkyl, aryl and/or hydroxyl, preferably H,
$R^5$ represents linear or branched $C_2$- to $C_{24}$-alkylene which may optionally be interrupted by heteroatoms such as O, S or N and may be substituted, preferably $CH_2$—$CH_2$ or $CH_2$—$CH(CH_3)$,
and wherein $R^1$ to $R^5$ may be identical or different from one another.

In a fourth embodiment the invention relates to a process according to the third embodiment, wherein
$R^1$=$CH_2$—$CH_2$ or $CH_2$—$CH(CH_3)$,
$R^2$=$C_2$- to $C_{24}$-alkylene,
$R^3$=$R^4$=H, and
$R^5$=$CH_2$—$CH_2$ or $CH_2$—$CH(CH_3)$.

In a fifth embodiment the invention relates to a process according to any of embodiments 1 to 4, characterized in that the alcohol containing at least two urethane groups is obtainable by reaction of cyclic carbonates with compounds having at least two amino groups.

In a sixth embodiment the invention relates to a process according to any of embodiments 1 to 5, characterized in that the alcohol containing at least two urethane groups is obtainable by reaction of propylene carbonate and/or ethylene carbonate with compounds having at least two amino groups.

In a seventh embodiment the invention relates to a process according to any of embodiments 1 to 6, characterized in that the alcohol containing two urethane groups is obtainable by reaction of propylene carbonate and/or ethylene carbonate with diamines of formula (III), $$HN(R^3)\text{—}R^2\text{—}NH(R^4) \quad\quad (III)$$

wherein $R^2$ to $R^4$ may be identical or different from one another and are as defined in claims 3 to 4.

In an eighth embodiment the invention relates to a process according to any of embodiments 1 to 7, characterized in that the alcohol containing two urethane groups is obtainable by reaction of propylene carbonate and/or ethylene carbonate with at least one compound selected from the group consisting of 1,2-ethanediamine, diaminopropane, diaminopentane, diaminohexane, diaminooctane, diaminodecane, diaminododecane, diaminooctadecane, diaminoeicosane, isophoronediamine, tolylenediamine and methylenedianiline.

In a ninth embodiment the invention relates to a process according to any of embodiments 1 to 8, characterized in that the alkylene oxide employed is at least one alkylene oxide selected from the group consisting of ethylene oxide and propylene oxide.

In a tenth embodiment the invention relates to a process according to any of embodiments 1 to 9, wherein the addition is effected in the presence of at least one DMC catalyst.

In an eleventh embodiment the invention relates to a process according to any of embodiments 1 to 9, wherein the addition is effected in the presence of a metal complex catalyst based on the metals zinc and/or cobalt.

In a twelfth embodiment the invention relates to a process according to any of embodiments 1 to 10, characterized in that
(α) the alcohol containing at least two urethane groups of formula (II) or a suspension medium are initially charged and optionally water and/or other volatile compounds are removed by means of elevated temperature and/or reduced pressure ("drying"), wherein DMC catalyst is added to the urethane alcohol of formula (II) or to the suspension medium before or after drying,
(β) to achieve activation a portion (based on the total amount of alkylene oxides employed in the activation and copolymerization) of alkylene oxide is added to the mixture resulting from step (α), wherein this addition of a portion of alkylene oxide may optionally be effected in the presence of $CO_2$ and wherein the temperature spike ("hotspot") which occurs due to the exothermic chemical reaction that follows and/or a pressure drop in the reactor is then awaited in each case, and wherein step (β) for achieving activation may also be effected repeatedly,
(γ) alkylene oxide, carbon dioxide and optionally urethane alcohol of formula (II) are added to the mixture resulting from step (β),
wherein at least in one of steps (α) or (γ) at least one urethane alcohol of formula (II) is added as an H-functional starter substance.

In a thirteenth embodiment the invention relates to a process according to any of embodiments 1 to 12, wherein one or more of the urethane alcohols of formula (II) as H-functional starter substance(s) are metered into the reactor continuously during the reaction.

In a fourteenth embodiment the invention relates to a process according to any of embodiments 1 to 10 and 12 to 13, wherein one or more urethane alcohols of formula (II), one or more alkylene oxides and DMC catalyst are metered into the reactor continuously in the presence of carbon dioxide ("copolymerization") and wherein the resulting reaction mixture (containing the reaction product) is removed from the reactor continuously.

In a fifteenth embodiment the invention relates to a process according to embodiment 14, wherein in a step (δ) the reaction mixture removed from the reactor continuously with a content of 0.05 wt % to 10 wt % of alkylene oxide is transferred into a postreactor in which, by way of a post-reaction, the content of free alkylene oxide is reduced to less than 0.05 wt % in the reaction mixture.

In a sixteenth embodiment the invention relates to polyether carbonate polyols containing a structural unit of formula (IV)

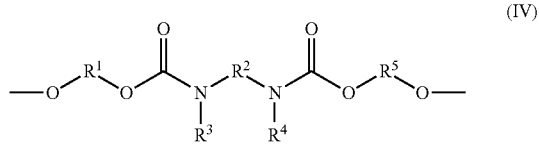

(IV)

wherein $R^1$ to $R^5$ may be identical or different from one another and are as defined in claims 3 to 4.

In a seventeenth embodiment the invention relates to polyether carbonate polyols obtainable by a process according to any of embodiments 1 to 15.

In an eighteenth embodiment the invention relates to polyether carbonate polyols according to embodiment 16 or 17, characterized in that they have an OH number of 3 mg KOH/g to 400 mg KOH/g, preferably of 10 mg KOH/g to 200 mg KOH/g, particularly preferably of 20 mg KOH/g to 150 mg KOH/g.

In a nineteenth embodiment, the invention relates to the use of a polyether carbonate polyol according to any of embodiments 16 to 18 for preparing a polyurethane polymer, preferably a flexible polyurethane foam, particularly preferably a flexible slabstock polyurethane foam or a flexible molded polyurethane foam.

In a twentieth embodiment the invention relates to a polyurethane polymer, preferably a flexible polyurethane foam, particularly preferably a flexible slabstock polyurethane foam or a flexible molded polyurethane foam obtainable by reaction of a polyisocyanate with a polyether carbonate polyol according to any of embodiments 16 to 18.

EXAMPLES

Test Methods:

Experimentally determined OH numbers were determined according to the provisions of DIN 53240.

The amine numbers (NH number) were determined according to the provisions of DIN 53176.

Viscosities were determined by rotational viscometer (Physica MCR 51, Anton Paar) according to the provisions of DIN 53018.

The fraction of incorporated $CO_2$ in the resulting polyether carbonate polyol ($CO_2$ content) and the ratio of propylene carbonate to polyether carbonate polyol were determined by $^1$H-NMR (Bruker, DPX 400, 400 MHz; pulse programme zg30, d1 relaxation delay: 10 s, 64 scans). Each sample was dissolved in deuterated chloroform. The relevant resonances in the $^1$H NMR (based on TMS=0 ppm) are as follows:
cyclic carbonate (formed as a by-product) resonance at 4.5 ppm, carbonate resulting from carbon dioxide incorporated in the polyether carbonate polyol (resonances at 5.1 to 4.8 ppm), unreacted propylene oxide (PO) having a resonance at 2.4 ppm, polyether polyol (i.e. without incorporated carbon dioxide) having resonances at 1.2 to 1.0 ppm.

The mole fraction of the carbonate incorporated in the polymer in the reaction mixture is calculated as follows by formula (XII), using the following abbreviations:
A(4.5)=area of the resonance at 4.5 ppm for cyclic carbonate (corresponds to an H atom)
A(5.1–4.8)=area of the resonance at 5.1–4.8 ppm for polyether carbonate polyol and an H atom for cyclic carbonate.
A(2.4)=area of the resonance at 2.4 ppm for free, unreacted PO
A(1.2–1.0)=area of the resonance at 1.2–1.0 ppm for polyether polyol Taking account of the relative intensities, according to the following formula (XII), a conversion was made to mol % for the polymer-bound carbonate ("linear carbonate" LC) in the reaction mixture:

$$LC = \frac{F(5.1-4.8) - F(4.5)}{F(5.1-4.8) + F(2.4) + 0.33*F(1.2-1.0)} *100 \quad \text{(XII)}$$

The weight fraction (in wt %) of polymer-bound carbonate (LC') in the reaction mixture was calculated according to formula (XIII), $$LC' = \frac{[F(5.1-4.8) - F(4.5)]*102}{D} *100\% \quad \text{(XIII)}$$

wherein the value of D ("denominator" D) is calculated according to formula (XIV):

$$D=[F(5.1-4.8)-F(4.5)]*102+F(4.5)*102+F(2.4)*58+0.33*F(1.2-1.0)*58 \quad \text{(XIV)}$$

The factor of 102 results from the sum of the molar masses of $CO_2$ (molar mass 44 g/mol) and of propylene oxide (molar mass 58 g/mol); the factor of 58 results from the molar mass of propylene oxide.

The weight fraction (in wt %) of cyclic carbonate (CC') in the reaction mixture was calculated according to formula (XV):

$$CC' = \frac{F(4.5)*102}{D} *100\% \quad \text{(XV)}$$

wherein the value of D is calculated according to formula (XIV).

In order to calculate the composition based on the polymer fraction (consisting of polyether formed from propylene oxide during the activation steps which take place under $CO_2$-free conditions, and polyether carbonate polyol formed from starter, propylene oxide and carbon dioxide during the activation steps which take place in the presence of $CO_2$ and during the copolymerization) from the values for the composition of the reaction mixture, the non-polymeric constituents of the reaction mixture (i.e. cyclic propylene carbonate and any unconverted propylene oxide present) were mathematically eliminated. The weight fraction of the repeating carbonate units in the polyether carbonate polyol was converted to a weight fraction of carbon dioxide using the factor F=44/(44+58). The figure for the $CO_2$ content in the polyether carbonate polyol ("$CO_2$ incorporated"; see examples which follow) is normalized to the polyether carbonate polyol molecule formed in the copolymerization and the activation steps.

The amount of cyclic propylene carbonate formed is determined via the mass balance of the total amount of cyclic propylene carbonate present in the reaction mixture and the amount of propylene carbonate used as the initial charge.

The apparent densities and compressive strengths (40% compression, 4th cycle) were determined according to DIN EN ISO 3386-1.

Raw Materials Used:

Catalyst for preparing the polyether carbonate polyols (DMC catalyst): double metal cyanide catalyst, containing zinc hexacyanocobaltate, tert-butanol and polypropylene glycol having a number-average molecular weight of 1000 g/mol; as per example 6 in WO-A 01/80994.

Cyclic propylene carbonate (cPC): Acros
1,3-Diaminopropane, Sigma-Aldrich
1,5-Diaminopentane, Sigma-Aldrich
Polyol B-1: trifunctional polyether polyol based on glycerol having a hydroxyl number of 48 mg KOH/g, obtained by copolymerization of 12 wt % of ethylene oxide with 88 wt % of propylene oxide
Stabilizer 1: siloxane-based foam stabilizer, Tegostab® BF 2370, Evonik Goldschmidt
Isocyanate 1: mixture of 80 wt % of tolylene 2,4- and 20 wt % of tolylene 2,6-diisocyanate, available under the name Desmodur@ T 80, Bayer MaterialScience AG
Catalyst 1: bis(2-dimethylaminoethyl) ether in dipropylene glycol, available as Addocat® 108, Rheinchemie
Catalyst 2: tin(II) ethylhexanoate, available as Dabco® T-9, Air Products Preparation of Diurethane Diols:

The alcohols according to the invention prepared in Examples 1 and 2 contain two hydroxyl groups and two urethane groups and are therefore referred to as diurethane diols.

Example 1

A 2 L four-necked flask fitted with a reflux condenser and a thermometer was initially charged with cyclic propylene carbonate (919 g, 9 mol). 1,3-diaminopropane (222 g, 3 mol) was then slowly added dropwise at 60° C. The reaction was then stirred at 60° C. for a further 24 h in total. After cooling to 25° C. the diurethane diol was obtained.

Product properties of the resulting diurethane diol:
OH number: 295 mg KOH/g
NH number: 0.8 mg KOH/g
Viscosity (25° C.): 2000 mPas Example 2

A 2 L four-necked flask fitted with a reflux condenser and a thermometer was initially charged with cyclic propylene carbonate (766 g, 7.5 mol). 1,5-diaminopentane (255 g, 2.5 mol) was then slowly added dropwise at 60° C. The reaction was then stirred at 60° C. for a further 24 h in total. After cooling to 25° C. the diurethane diol was obtained.

Product properties of the resulting diurethane diol:
OH number: 278 mg KOH/g
NH number: 0.9 mg KOH/g
Viscosity (25° C.): 2100 mPas Preparation of Polyether Carbonate Polyols Example 3 (Copolymerization of PO and $CO_2$ with Continuous Metered Addition of the Diurethane Diol Starter Compound)

Step (α) ("Drying"):

664 mg of dried unactivated DMC catalyst were suspended in 102 g of 4-methyl-2-oxo-1,3-dioxolane (also referred to hereinafter as cyclic propylene carbonate or cPC) and the suspension was then introduced into a 2 L pressure reactor fitted with a gas metering unit. The suspension was then heated to 130° C. and over 30 min approx. 30 L/h of nitrogen was introduced while at the same time a reduced pressure of 75-100 mbar was applied.

Step (β) ("Catalyst Activation"):

In the reactor, at 130° C., 1200 rpm and at a supply pressure of around 100 mbar established with nitrogen, an amount of 20 g of propylene oxide (PO) was added all at once. Onset of the reaction was denoted by a temperature peak ("hotspot") and by a pressure drop to the starting pressure. After the first pressure drop, the reactor was pressurized to p=50 bar with $CO_2$ and then a further 20 g of PO were added all at once for activation. After a delay another temperature peak occurred and the total pressure in the reactor once again showed a pressure decrease.

Step (γ) ("Copolymerization of PO and $CO_2$ with Continuous Metered Addition of the Diurethane Diol Starter Compound"):

After step (β) propylene oxide (974.9 g) at 4.10 g/min and 374.5 g of the diurethane diol from Example 1 (admixed with 172 mg $H_3PO_4$) at 1.77 g/min were simultaneously metered into the reactor at 105° C. The progress of the reaction was monitored via the $CO_2$ consumption and the pressure in the reactor was kept constant at 50 bar of $CO_2$ by continuous replenishment under closed-loop control.

After completion of the PO addition stirring was continued (1200 rpm) at 105° C. and reaction pressure until $CO_2$ consumption had abated. This postreaction lasted for about 3 h.

The obtained product mixture was freed of traces of monomeric propylene oxide using a rotary evaporator and stabilized by addition of 500 ppm of Irganox 1076. The cyclic propylene carbonate was then separated from the reaction mixture by thin film evaporation (0.1 mbar, 120° C.). The $CO_2$ fraction incorporated in the polyether carbonate polyol, the viscosity and the OH number were determined by the abovementioned analytical methods.

Properties of the resulting polyether carbonate polyol:
OH number: 93 mg KOH/g
Viscosity (25° C.): 3965 mPas
$CO_2$ content: 8.6%

Example 4: Copolymerization of PO and $CO_2$ with Continuous Metered Addition of the Diurethane Diol Starter Compound Step (α) ("Drying"):

517 mg of dried unactivated DMC catalyst were suspended in 102 g of 4-methyl-2-oxo-1,3-dioxolane (also referred to hereinafter as cyclic propylene carbonate or cPC) and the suspension was then introduced into a 2 L pressure reactor fitted with a gas metering unit. The suspension was then heated to 130° C. and over 30 min 30 L/h of nitrogen was introduced while at the same time a reduced pressure of 75 mbar was applied.

Step (β) ("Catalyst Activation"):

In the reactor, at 130° C., 1200 rpm and at a supply pressure of around 100 mbar which had been established with nitrogen, an amount of 20 g of propylene oxide (PO) was added all at once. Onset of the reaction was denoted by a temperature peak ("hotspot") and by a pressure drop to the starting pressure. After the first pressure drop, the reactor was pressurized to p=50 bar with $CO_2$ and then a further 20 g of PO were added all at once for activation. After a delay another temperature peak occurred and the total pressure in the reactor once again showed a pressure decrease.

Step (γ) ("Copolymerization of PO and $CO_2$ with Continuous Metered Addition of the Diurethane Diol Starter Compound"):

After step (β) propylene oxide (596.9 g) at 2 g/min and 234 g of the diurethane diol from Example 2 (admixed with 107 mg $H_3PO_4$) at 0.88 g/min were simultaneously metered into the reactor at 105° C. The progress of the reaction was monitored via the $CO_2$ consumption and the pressure in the reactor was kept constant at 50 bar of $CO_2$ by continuous replenishment under closed-loop control. After completion of the PO addition stirring was continued (1200 rpm) at 105° C. and reaction pressure until $CO_2$ consumption had abated. This postreaction lasted for about 3 h.

The obtained product mixture was freed of traces of monomeric propylene oxide using a rotary evaporator and stabilized by addition of 500 ppm of Irganox 1076. The cyclic propylene carbonate was then separated from the reaction mixture by thin film evaporation (0.1 mbar, 120° C.). The $CO_2$ fraction incorporated in the polyether carbonate polyol, the viscosity and the OH number were determined by the abovementioned analytical methods.

Properties of the resulting polyether carbonate polyol:
OH number: 86.2 mg KOH/g
Viscosity (25° C.): 5450 mPas
$CO_2$ content: 9.4%

Preparation of Flexible Polyurethane Foams

Examples 5 and 6

The input materials recited in the examples of table 1 which follows were reacted with one another in the manner of processing customary for the preparation of polyurethane foams by the one-step method.

Flexible polyurethane foams were prepared according to the formulation shown in table 1 which follows, using, inter alia, polyether carbonate polyols from Examples 3 and 4 in the polyol component. The fractions of the components are listed in parts by weight.

High-quality flexible polyurethane foams having a uniform cell structure were obtained which were characterized by determination of apparent densities and compressive strengths (compressive strength measured at 40% compression) (table 1). Examples 5 and 6 thus demonstrate that the polyether polyols according to the invention are suitable for preparing polyurethanes (here: flexible polyurethane foams).

TABLE 1

| Preparation of flexible polyurethane foams | | |
|---|---|---|
| Example | 5 | 6 |
| Polyol B-1 | 50 | 50 |
| Polyether carbonate polyol from Example 3 | 50 | — |
| Polyether carbonate polyol from Example 4 | — | 50 |
| Stabilizer 1 | 1.20 | 1.20 |
| Catalyst 1 | 0.12 | 0.12 |
| Catalyst 2 | 0.18 | 0.18 |
| Water | 4.50 | 4.50 |
| Isocyanate 1 | 58.8 | 58.2 |
| NCO index | 108 | 108 |
| Apparent density [kg/m³] | 23.1 | 23.2 |
| Compressive strength, 4th cycle [kPa] | 5.9 | 7.6 |

The invention claimed is:

1. A process for preparing polyether carbonate polyols comprising adding alkylene oxides and carbon dioxide onto H-functional starter compounds, wherein the H-functional starter compound comprises at least one alcohol containing at least two urethane groups.

2. The process as claimed in claim 1, wherein the H-functional starter compound comprises at least one alcohol containing two urethane groups.

3. The process as claimed in claim 2, wherein said at least one alcohol containing two urethane groups corresponds to the formula (II),

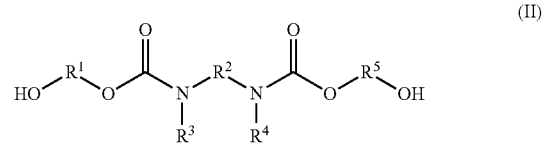

wherein
$R^1$ represents a linear or branched $C_2$- to $C_{24}$-alkylene which may optionally be interrupted by heteroatoms which are selected from O, S and/or N and may be substituted,
$R^2$ represents a linear or branched $C_2$- to $C_{24}$-alkylene, $C_3$- to $C_{24}$-cycloalkylene, $C_4$- to $C_{24}$-arylene, $C_5$- to $C_{24}$-aralkylene, $C_2$- to $C_{24}$-alkenylene, $C_2$- to $C_{24}$-alkynylene, each of which may optionally be interrupted by heteroatoms which are selected from O, S and/or N, and/or each of which may be substituted by alkyl, aryl and/or hydroxyl,
$R^3$ represents a H atom, a linear or branched $C_1$- to $C_{24}$-alkyl, $C_3$- to $C_{24}$-cycloalkyl, $C_4$- to $C_{24}$-aryl, $C_5$- to $C_{24}$-aralkyl, $C_2$- to $C_{24}$-alkenyl, $C_2$- to $C_{24}$-alkynyl, each of which may optionally be interrupted by heteroatoms which are selected from O, S and/or N, and/or each of which may be substituted by alkyl, aryl and/or hydroxyl,
$R^4$ represents a H atom, a linear or branched $C_1$- to $C_{24}$-alkyl, $C_3$- to $C_{24}$-cycloalkyl, $C_4$- to $C_{24}$-aryl, $C_5$- to $C_{24}$-aralkyl, $C_2$- to $C_{24}$-alkenyl, $C_2$- to $C_{24}$-alkynyl, each of which may optionally be interrupted by heteroatoms which are selected from O, S and/or N, and/or each of which may be substituted by alkyl, aryl and/or hydroxyl,
$R^5$ represents a linear or branched $C_2$- to $C_{24}$-alkylene which may optionally be interrupted by heteroatoms which are selected from O, S and/or N, and may be substituted, and each of $R^1$ to $R^5$ may be identical or different from one another.

4. The process as claimed in claim 3, wherein
$R^1$ represents a $CH_2$—$CH_2$ or a $CH_2$—$CH(CH_3)$,
$R^2$ represents a $C_2$- to $C_{24}$— alkylene,
$R^3$ and $R^4$ each represent a H atom, and
$R^5$ represents a $CH_2$—$CH_2$ or a $CH_2$—$CH(CH_3)$.

5. The process as claimed in claim 1, wherein said alcohol containing at least two urethane groups comprises the reaction product of propylene carbonate and/or ethylene carbonate with compounds having at least two amino groups.

6. The process as claimed in claim 1, wherein said alcohol containing two urethane groups comprises the reaction product of propylene carbonate and/or ethylene carbonate with diamines corresponding to formula (III), $$HN(R^3)\text{—}R^2\text{—}NH(R^4) \quad (III)$$

wherein
$R^2$ to $R^4$ may be identical or different from one another and
$R^2$ represents a linear or branched $C_2$- to $C_{24}$-alkylene, $C_3$- to $C_{24}$-cycloalkylene, $C_4$- to $C_{24}$-arylene, $C_5$- to $C_{24}$-aralkylene, $C_2$- to $C_{24}$-alkenylene, $C_2$- to $C_{24}$-alkynylene, each of which may optionally be interrupted by heteroatoms which are selected from O, S and/or N, and/or each of which may be substituted by alkyl, aryl and/or hydroxyl,
$R^3$ represents a H atom, a linear or branched $C_1$- to $C_{24}$-alkyl, $C_3$- to $C_{24}$-cycloalkyl, $C_4$- to $C_{24}$-aryl, $C_5$- to $C_{24}$-aralkyl, $C_2$- to $C_{24}$-alkenyl, $C_2$- to $C_{24}$-alkynyl, each of which may optionally be interrupted by heteroatoms which are selected from O, S and/or N, and/or each of which may be substituted by alkyl, aryl and/or hydroxyl,
$R^4$ represents a H atom, a linear or branched $C_1$- to $C_{24}$-alkyl, $C_3$- to $C_{24}$-cycloalkyl, $C_4$- to $C_{24}$-aryl, $C_5$- to $C_{24}$-aralkyl, $C_2$- to $C_{24}$-alkenyl, $C_2$- to $C_{24}$-alkynyl, each of which may optionally be interrupted by heteroatoms which are selected from O, S and/or N, and/or each of which may be substituted by alkyl, aryl and/or hydroxyl.

7. The process as claimed in claim 1, wherein said alcohol containing two urethane groups comprises the reaction product of propylene carbonate and/or ethylene carbonate with at least one compound selected from the group consisting of 1,2-ethanediamine, diaminopropane, diaminopentane, diaminohexane, diaminooctane, diaminodecane, diaminododecane, diaminooctadecane, diaminoeicosane, isophoronediamine, tolylenediamine and methylenedianiline.

8. The process as claimed in claim 1, wherein adding alkylene oxides and carbon dioxide onto H-functional starter compounds occurs in the presence of at least one DMC catalyst.

9. The process as claimed in claim 1, wherein adding alkylene oxides and carbon dioxide onto H-functional starter compounds occurs in the presence of a metal complex catalyst based on the metals zinc and/or cobalt.

10. The process as claimed in claim 1, comprising
(α) initially charging the alcohol containing at least two urethane groups corresponding to formula (II) or a suspension medium and optionally, removing water and/or other volatile compounds by means of elevated temperature and/or reduced pressure ("drying"), wherein DMC catalyst is added to the urethane alcohol corresponding to formula (II) or to the suspension medium before or after drying,
(β) activating said DMC catalyst by adding a portion (based on the total amount of alkylene oxides employed in the activation and copolymerization) of alkylene oxide to the mixture resulting from (α), wherein this addition of a portion of alkylene oxide may optionally be effected in the presence of $CO_2$ and wherein the temperature spike ("hotspot") which occurs due to the exothermic chemical reaction that follows and/or a pressure drop in the reactor is then awaited in each case, and wherein (β) for achieving activation may also be effected repeatedly,
(γ) adding alkylene oxide, carbon dioxide and optionally urethane alcohol corresponding to formula (II) to the mixture resulting from (β),
additionally comprising adding in at least one of (α) or (γ) an H-functional starter substance comprising at least one urethane alcohol corresponding to formula (II).

11. The process as claimed in claim 1, comprising continuously metering an H-functional starter substance comprising one or more urethane alcohols corresponding to formula (II) into the reactor during the reaction.

12. The process as claimed in claim 11, comprising continuously metering one or more urethane alcohols corresponding to formula (II), one or more alkylene oxides and DMC catalyst into the reactor in the presence of carbon dioxide ("copolymerization"), and continuously removing the resulting reaction mixture (containing the reaction product) from the reactor.

* * * * *